United States Patent [19]

Howell et al.

[11] Patent Number: 5,002,624

[45] Date of Patent: Mar. 26, 1991

[54] METHOD FOR MAKING COMPOSITE SHEET MATERIAL

[75] Inventors: George D. Howell; R. Michael Mahan, both of Arlington; Irvin E. Hurt, Duncanville, all of Tex.

[73] Assignee: Impact Extrusions, Inc., Irving, Tex.

[21] Appl. No.: 185,035

[22] Filed: Apr. 22, 1988

[51] Int. Cl.[5] ............................................. B29B 47/06
[52] U.S. Cl. ............................. 156/243; 156/244.11; 156/244.18; 156/244.19; 156/244.27; 428/212; 524/426
[58] Field of Search ............. 156/243, 244.11, 244.18, 156/244.19, 244.27, 500, 494, 495; 428/327, 212; 524/426; 425/133.5; 264/176.1, 145, 148

[56] References Cited

U.S. PATENT DOCUMENTS

| | | | |
|---|---|---|---|
| 3,589,975 | 6/1971 | Andrews et al. | 156/244.19 |
| 3,850,729 | 11/1974 | Paulson et al. | 156/494 |
| 4,101,702 | 7/1978 | Churchill et al. | 428/213 |
| 4,192,116 | 3/1980 | Kelly | 52/469 |
| 4,229,504 | 10/1980 | Brachman | 524/426 |
| 4,233,356 | 11/1980 | Jacobs | 428/244 |
| 4,289,560 | 9/1981 | Simons | 156/244.19 |
| 4,537,825 | 8/1985 | Yardley | 156/331.1 |
| 4,705,818 | 11/1987 | Kawai et al. | 524/426 |
| 4,833,194 | 5/1989 | Kuan et al. | 524/427 |

Primary Examiner—Caleb Weston
Attorney, Agent, or Firm—Ben D. Tobor

[57] ABSTRACT

A composite sheet material especially suited as a roofing material is disclosed. The sheet is a composite of extruded top and bottom layers. The top layer is formed by extrusion of a mixture of cured rubber particles dispersed in a matrix of polypropylene. The bottom layer is formed by coextrusion with the top layer of a mixture of calcium carbonate and cured rubber particles dispersed in a matrix of polypropylene. The method of fabricating the composite sheet material includes trimming longitudinal edges of the material with powered circular blades as it moves between chill rollers and a pull roller assembly. The material is spooled with minimum winding tension so as to prevent tension forces from being set in the material.

7 Claims, 2 Drawing Sheets

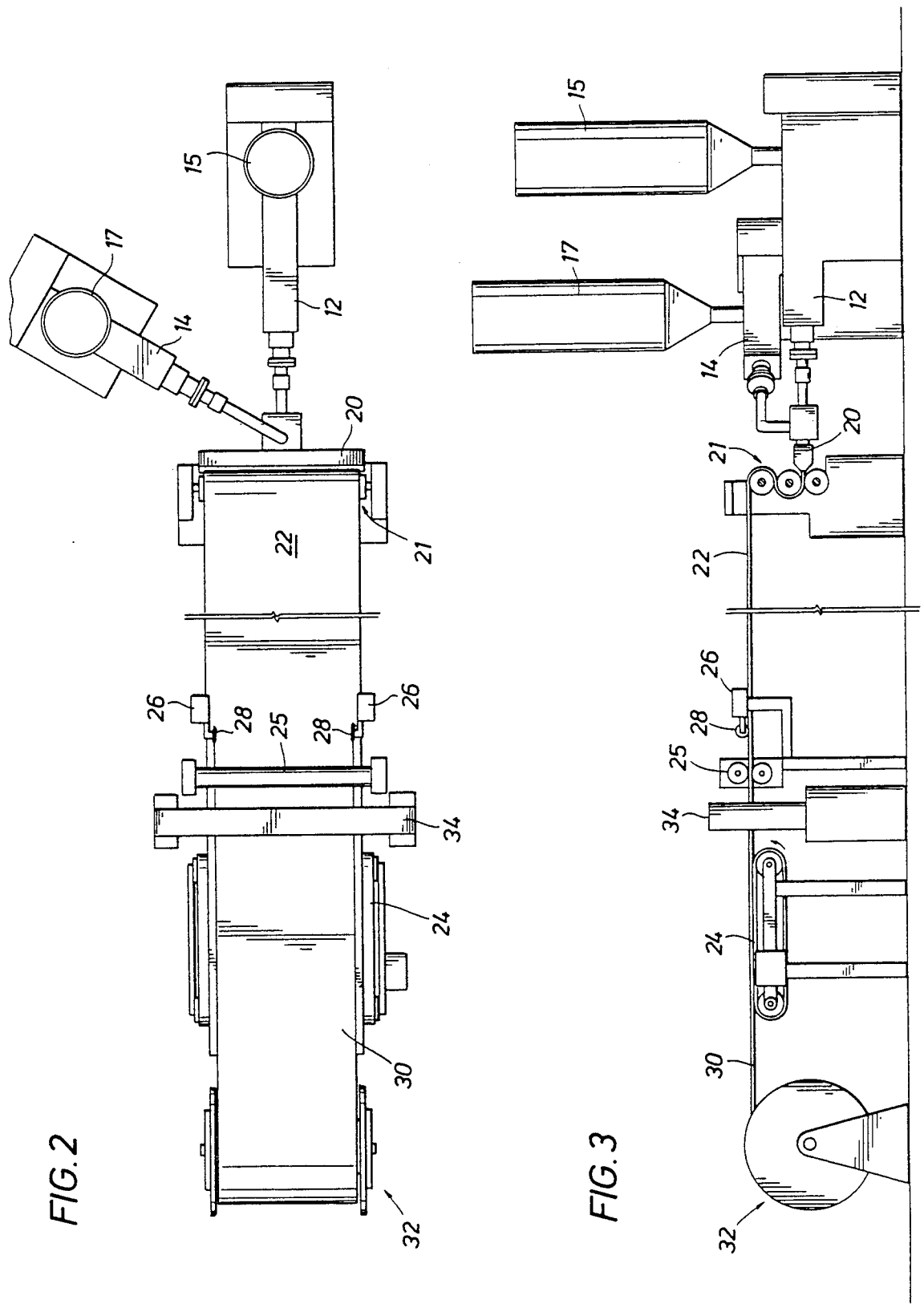

METHOD FOR MAKING COMPOSITE SHEET MATERIAL

BACKGROUND OF THE INVENTION

1. Field of the Invention

This invention relates generally to roofing materials and in particular to materials for level flat roofs of office buildings, shopping centers, industrial buildings and the like. Still more particularly the invention relates to a composite sheet material and its method of manufacture which is essentially waterproof, relatively insensitive to ultraviolet light, and easily applied as a roof covering to a flat level surface.

2. Description of the Prior Art

Sheet materials containing elastomeric or rubber compounds have been long used in the art for providing a roofing layer which is essentially waterproof. Recently, a thermoplastic rubber product, sold under the registered trademark SANTOPRENE by the Monsanto Company, has been extruded into a sheet material suitable for use as a roof covering.

The SANTOPRENE material is essentially a composition of cured or vulcanized ethylene propylene diene monomer rubber in a matrix of polypropylene. The percentages of components vary depending on the particular grade of SANTOPRENE used. It may be described as exhibiting the elastomeric performance of vulcanized rubbers and the processing simplicity of thermoplastic polymers.

The SANTOPRENE material is supplied as small free flowing pellets which may be extruded in a sheet die to form sheet material. Special additives have been added to the SANTOPRENE material in the past to increase its ultraviolet radiation resistance. Other additives serve to provide flame resistance to the SANTOPRENE material.

While the SANTOPRENE product results in a marginally acceptable roofing material when extruded into sheet form, its relatively high cost makes it difficult to compete in price with other rubberized roofing sheet materials. In addition, better performance of a composite sheet material has been desired than heretofore have been achievable with single layer SANTOPRENE.

IDENTIFICATION OF OBJECTS OF THE INVENTION

It is therefore a general object of the invention to provide a roofing sheet material having one layer primarily of SANTOPRENE mixture, but with a second layer of less expensive material resulting in a cheaper composite material with enhanced functional performance with respect to a single layer SANTOPRENE material.

It is another object of the invention to provide a second layer of material which substantially matches the viscosity of SANTOPRENE so as to enhance the coextrusion characteristics of the two layers of the resulting composite sheet material.

It is still another object of the invention to provide a second layer of material for coextrusion with a first layer of SANTOPRENE resulting in a composite sheet which has enhanced tear resistance, enhanced low temperature flexibility, low temperature toughness, decreased low temperature brittleness, added rigidity, but not so much rigidity that it will fail to lie flat during application to a roofing surface. In other words the composite sheet must be resistant to taking a "set" when rolled during the manufacturing process for storage and transportation to its end use.

It is another object of the invention to provide a method of manufacturing a composite sheet material described above so that its resistance to taking a "set" is maximized.

SUMMARY

The objects described above, as well as other advantages and features of the invention are obtained with a composite sheet material having two coextruded layers. A top layer is formed of SANTOPRENE material, that is, of cured rubber particles dispersed in a matrix of polypropylene. A bottom layer of the composite material is coextruded with the top layer, but of a mixture of calcium carbonate and rubber particles dispersed in polypropylene. According to a preferred embodiment of the invention, the bottom layer is formed of a mixture of about 30% by weight of calcium carbonate, about 50% by weight of polypropylene and about 19% by weight of EPDM rubber. The bottom layer contains about 1% by weight of anti-oxidizing stabilizer material.

The method of the invention includes coextruding top and bottom layers of the mixtures as described above into a composite intermediate layer from a sheet die and applied to chill rollers. Longitudinal edges of the sheet are trimmed with powered circular cutters as the sheet proceeds to a pull roller. A low tension spooling system spools the trimmed sheet which is periodically sheared into standard lengths for storage and transportation. These steps are provided to minimize tension forces in the sheet thereby minimizing the tendency of the material to memorize or to "set" stretch or tension forces during its manufacture.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is presented of which:

FIG. 2 is a plan view of apparatus for a coextrusion process by which an intermediate sheet material which exits from a sheet die is applied first to chill rollers and then to a pull roller assembly where its longitudinal edges are trimmed with powered circular blades and then spooled for storage;

FIG. 3 is a side view of the equipment of FIG. 2;

DESCRIPTION OF THE INVENTION

Figure 5:
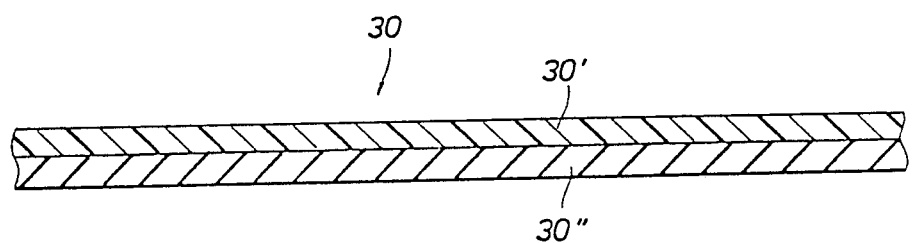
FIG. 5 is a cross-section of the composite sheet material fabricated according to the invention.

This invention is for a composite sheet product 30, illustrated in FIG. 5, having a top layer 30' and a bottom layer 30", which has qualities especially suited as a roofing material. The top layer 30' is coextruded with the bottom layer 30" according to a method of manufacture illustrated in FIGS. 1-4. As indicated above in the summary section, the top layer is extruded of rubber particles dispersed in a matrix of polypropylene. The material for such extrusion comprises pellets of a material sold under name SANTOPRENE, a trademark of the Monsanto Company. The bottom layer 30" is coextruded with the top layer. The material for such coextrusion of the bottom layer is a mixture of calcium carbonate and rubber particles dispersed in a matrix of polypropylene.

Figure 1:
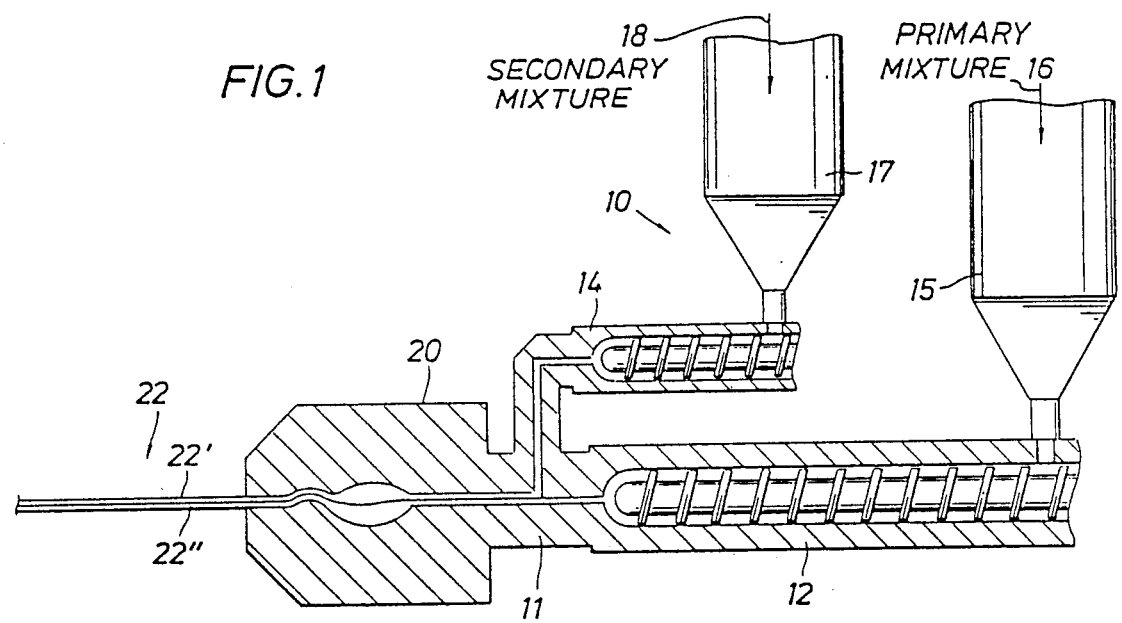
FIG. 1 is an illustration of a typical coextrusion process by which two or more resins are simultaneously extruded to form a composite sheet material.
Figure 4:
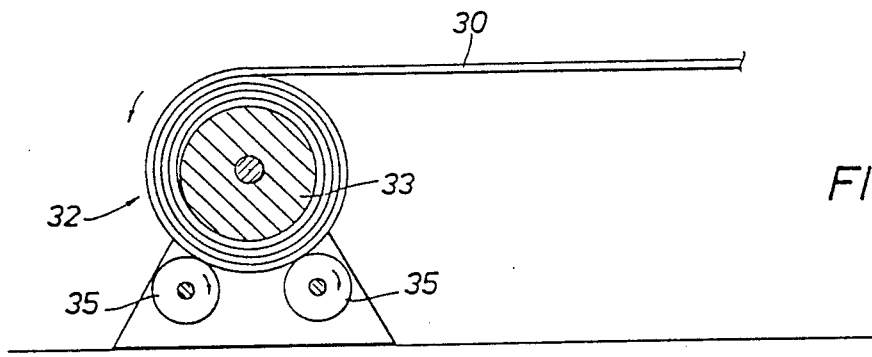
FIG. 4 is an illustration of a low tension spool.

A description of the method of manufacture of the composite sheet 30 as illustrated in FIGS. 1-4 provides a vehicle for not only defining the method of this invention, but also a way to define with more particularity the preferred ingredients of composite sheet 30. FIG. 1 is a schematic illustration of coextrusion equipment 10. Coextrusion is the simultaneous extrusion of two or more resins out of one die, involving materials of the same chemical structure, or polymers of dissimilar structure. FIG. 1 illustrates a conventional flat sheet die 20 preceded by a feedblock 11 in which the different layers of material are assembled. A primary mixture 16 in primary hopper 15 is applied to a primary extruder 12 and applied to feedblock 11 to form the bottom layer 22" of intermediate sheet 22 exiting from sheet die 20. A secondary mixture 18 in secondary hopper 17 is applied to a secondary extruder 14 and applied to feedblock 11 to form the top layer 22' of intermediate sheet 22 exiting from sheet die 20. The hoppers 15, 17, extruders 12, 14, feedblock 11 and sheet die 20 are of conventional design.

According to the invention the secondary mixture 18 applied to secondary hopper 17 and forming the extruded top layer 22' of intermediate sheet 22 is SANTOPRENE pellets which is a mixture of cured ethylene propylene diene monomer (EPDM) particles in a matrix of polypropylene. It is preferred to use a relatively flexible grade of black SANTOPRENE pellets (Monsanto order number 151-87-W163) for the top layer 22' in that small amounts of carbon black added to the pellets acts as an ultraviolet shield to the polypropylene matrix which is highly susceptible to ultraviolet radiation breakdown. A relatively flexible grade of white SANTOPRENE pellets may also be used (Monsanto order number 251-87-W164).

The primary mixture 16 which is extruded as the bottom layer 22" of the intermediate sheet 22 is preferably a 20 mixture of about 10 to 50% by weight of calcium carbonate and about 90 to 50% by weight of rubber particles dispersed in a matrix of polypropylene. In a preferred embodiment, the primary mixture 16 includes about 30% by weight of calcium carbonate and about 50% by weight of polypropylene and about 19% by weight of EPDM rubber. Anti-oxident stabilizer and ultraviolet stabilizer particles of about 1% by weight are also preferred to be added to the primary mixture 16.

Although EPDM rubber is the preferred rubber component of the primary mixture 16, other rubbers which are compatible with polypropylene may be used. Examples of such rubber are styrenic block copolymers and ethylene rubbers as commonly found in copolymer polypropylene.

As illustrated in FIGS. 2 and 3, the intermediate sheet 22 is applied to a conventional chill roller system 21 and then to a pull roller assembly 25. In order to eliminate tension forces during trimming of longitudinal edges of the intermediate sheet 22, powered cutters 26 having circular blades 28 are provided to trim such edges while intermediate sheet 22 is progressing toward pull roller assembly 25. Such powered cutters 26 are similar to "pizza cutters" used in slicing pizza food product.

Elimination of tension forces in sheet 22 during its manufacture is an important manufacturing feature of this invention, because the composite sheet is susceptible to "memorizing" those forces, especially unequal forces across its lateral extent. In conventional terms, the sheet is susceptible to "setting" those tension forces during manufacture resulting in a washboard or wavy set in the material after it is spooled for storage and later transported to a roofing site. In other words, memorization of tension forces prevents the final product from laying flat on a roof, a defect which would render the composite sheet material unacceptable as a roofing material.

After the longitudinal edges of intermediate sheet 22 are trimmed, the composite sheet product 30 progresses to spooling system comprising winder 32 and conveyor belt 24. The conveyor belt 24 accepts sheet 30 after shearing by shear 34 and carries it to winder 32 which pulls the sheet 30 at low by rollers 35. Sheet lengths of 100 feet are standard.

The resulting composite sheet 30 of FIG. 5 is advantageous as a roofing material as compared to a single extruded sheet of SANTOPRENE. The preferred thickness of composite sheet 30 is about 0.040". Where the top layer 30' is white SANTOPRENE, the top layer thickness is preferably about 25% of the composite sheet 30. Where the top layer 30" is black SANTOPRENE, the top layer thickness is preferably about 15% of the composite sheet 30. The calcium carbonate chemical of the bottom layer 30" renders the composite sheet material more flexible at low temperatures, decreases its brittleness at low temperatures, increases its tear resistance and increases its low temperature toughness as compared with single sheet SANTOPRENE. Its presence in the bottom layer material advantageously allows the viscosity of the extruded primary mixture to match that of the extruded secondary mixture thereby enhancing the coextrusion process. Its presence in the bottom layer also abates the tendency of the material to memorize manufacturing tension in the sheet or spooling positions for storage and enhances its lying flat when applied to a roof.

Various modifications and alterations in the described structures will be apparent to those skilled in the art of the foregoing description which does not depart from the spirit of the invention. For this reason, these changes are desired to be included in the appended claims. The claims which follow recite the only limitations to the present invention and the descriptive manner which is employed for setting forth the embodiments and is to be interpreted as illustrative and not limitative.

What is claimed is:

1. In a method for fabricating a composite sheet material, the steps of
    extruding a first mixture of cured rubber particles dispersed in a matrix of polypropylene to a top portion of a sheet die,
    extruding a second mixture of rubber particles dispersed in a matrix of polypropylene and calcium carbonate particles to a bottom portion of said sheet die, said die forming a continuous intermediate composite sheet exiting therefrom,
    applying said intermediate sheet via chill rollers to a pull roller assembly,
    trimming longitudinal edges of said intermediate sheet with powered circular blades while said intermediate sheet is between said chill rollers and said pull roller assembly thereby forming said composite sheet material, and spooling said composite sheet material.

2. The method of claim 1 further comprising the step of shearing said composite sheet material across its lateral width.

3. The method of claim 1 wherein said spooling step is accomplished with a spooling system comprising a low tension winder and a conveyor belt.

4. The method of claim 1 wherein
said first mixture is Ethylene Propylene Diene Monomer (EPDM) particles and polypropylene, and
said second mixture is about 10 to 50% by weight of calcium carbonate and about 90 to 50% by weight of a mixture of EPDM rubber and polypropylene.

5. The method of claim 4 wherein
said second mixture includes about 30% by weight of calcium carbonate and about 69% by weight of a mixture of EPDM and polypropylene.

6. The method of claim 5 wherein
said second mixture including a mixture of EPDM and polypropylene includes about 50% by weight of polypropylene and about 19% by weight of EPDM.

7. The method of claim 6 wherein said second mixture further comprises about 1% by weight of anti-oxident stabilizer and ultraviolet stabilizer particles.

* * * * *